(12) United States Patent
Takahashi (10) Patent No.: US 9,621,074 B2
(45) Date of Patent: Apr. 11, 2017

(54) INERTIAL DRIVE ACTUATOR

(71) Applicant: OLYMPUS CORPORATION, Tokyo (JP)

(72) Inventor: Masaya Takahashi, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 475 days.

(21) Appl. No.: 14/149,934

(22) Filed: Jan. 8, 2014

(65) Prior Publication Data

US 2014/0117813 A1 May 1, 2014

Related U.S. Application Data

(63) Continuation of application No. PCT/JP2012/067298, filed on Jul. 6, 2012.

(30) Foreign Application Priority Data

Jul. 8, 2011 (JP) .................................. 2011-151844

(51) Int. Cl.
H02N 2/02 (2006.01)

(52) U.S. Cl.
CPC ............ H02N 2/026 (2013.01); H02N 2/025 (2013.01)

(58) Field of Classification Search
CPC ................................ H02N 2/026; H02N 2/025
USPC ............................................. 310/329, 323.02
See application file for complete search history.

(56) References Cited

U.S. PATENT DOCUMENTS

| | | | |
|---|---|---|---|
| 5,134,335 A | 7/1992 | Ikemoto et al. | |
| 5,663,855 A * | 9/1997 | Kim | ......................... G11B 5/54<br>360/256.2 |
| 7,535,661 B2 | 5/2009 | Matsuki | |
| 7,808,153 B2 | 10/2010 | Matsuki | |
| 7,986,074 B2 | 7/2011 | Matsuki | |
| 2006/0103266 A1* | 5/2006 | Okamoto | ............... H02N 2/025<br>310/328 |

(Continued)

FOREIGN PATENT DOCUMENTS

| | | |
|---|---|---|
| EP | 2 117 057 A2 | 11/2009 |
| JP | 01-138975 A | 5/1989 |

(Continued)

OTHER PUBLICATIONS

Extended Supplementary European Search Report dated Mar. 26, 2015 from related European Application No. 12 81 1535.9.

(Continued)

*Primary Examiner* — Shawki S Ismail
*Assistant Examiner* — Bryan Gordon
(74) *Attorney, Agent, or Firm* — Scully, Scott, Murphy & Presser, P.C.

(57) ABSTRACT

An inertial drive actuator includes a shift unit that generates a small shift, a vibration base plate that moves to and fro with the small shift of the shift unit, a mover having a first magnetic field generating unit, a first yoke, and a second yoke. The first yoke and an end portion of the second yoke are opposed to each other at a position outside the vibration base plate, thereby restricting movement of the mover with respect to the direction perpendicular to the driving direction. The frictional force acting between the mover and the vibration base plate is controlled by controlling a magnetic field generated by the first magnetic field generating unit to drive the mover.

12 Claims, 11 Drawing Sheets

(56) References Cited

U.S. PATENT DOCUMENTS

| | | | |
|---|---|---|---|
| 2007/0096602 A1 | 5/2007 | Matsuki | |
| 2007/0241640 A1* | 10/2007 | Matsuki | H02N 2/025 310/323.01 |
| 2008/0230694 A1* | 9/2008 | Frosien | H01J 37/12 250/307 |
| 2009/0015949 A1* | 1/2009 | Matsuki | H02N 2/025 359/824 |
| 2009/0021114 A1* | 1/2009 | Adachi | H01L 41/083 310/323.16 |
| 2009/0039875 A1* | 2/2009 | Hoshino | G01D 5/145 324/207.21 |
| 2009/0189486 A1 | 7/2009 | Matsuki | |
| 2009/0277300 A1* | 11/2009 | Matsuki | G01D 5/2412 74/99 R |
| 2011/0013029 A1* | 1/2011 | Akutsu | G03B 5/00 348/208.11 |

FOREIGN PATENT DOCUMENTS

| | | |
|---|---|---|
| JP | 04-000273 A | 1/1992 |
| JP | 11-069847 A | 3/1999 |
| JP | 2007-129821 A | 5/2007 |
| JP | 2007-288828 A | 11/2007 |
| JP | 2009-177974 A | 8/2009 |
| JP | 2009-273253 A | 11/2009 |
| JP | 5185640 B2 | 1/2013 |

OTHER PUBLICATIONS

International Preliminary Report on Patentability dated Jan. 23, 2014 from related International Application No. PCT/JP2012/067298, together with an English language translation.

International Search Report dated Oct. 2, 2012 issued in PCT/JP2012/067298.

* cited by examiner

SHIFT OF PIEZOELECTRIC ELEMENT

INERTIAL DRIVE ACTUATOR

CROSS REFERENCE TO RELATED APPLICATIONS

The present application is a continuation of PCT/JP2012/067298, filed on Jul. 6, 2012, which is based upon and claims the benefit of priority from Japanese Patent Application No. 2011-151844, filed on Jul. 8, 2011, the entire contents of each of which are incorporated herein by reference.

BACKGROUND OF THE INVENTION

Field of the Invention

The present invention relates to an inertial drive actuator that causes a movable member to move in a predetermined direction.

Description of the Related Art

There is a known actuator in which saw-tooth pulses are supplied to an electromechanical transducer coupled with a drive shaft to shift the drive shaft in the axial direction, thereby moving a movable member frictionally coupled with the drive shaft in the axial direction. (Such an actuator will be hereinafter referred to as an "impact drive actuator" or "inertial drive actuator".)

Figure 11A:
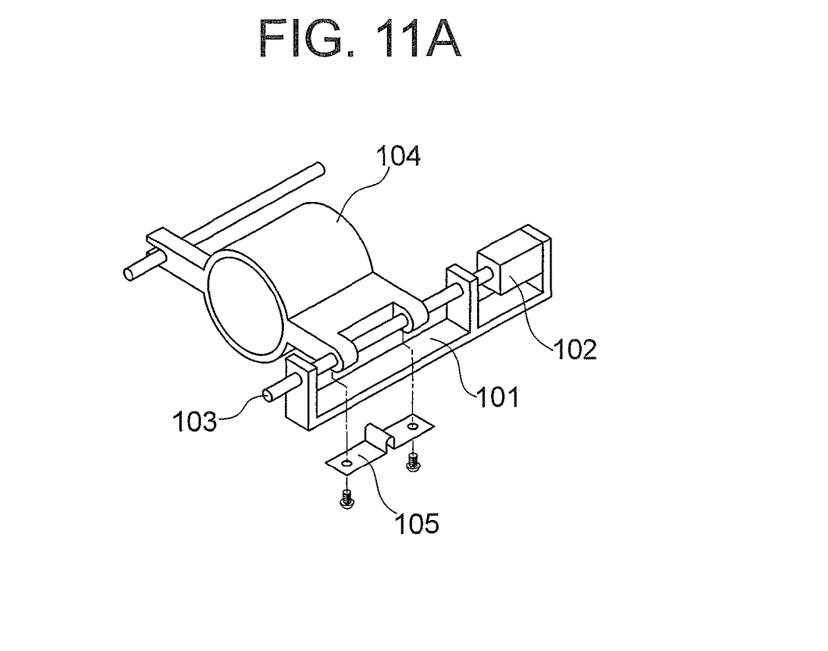

Such an impact drive actuator is disclosed in Japanese Patent Application Laid-Open No. 2007-288828. FIG. 11A shows the construction of the impact drive actuator. A vibration member 103 is inserted through holes provided in standing portions of a support member 101 and movable in the axial direction of the vibration member 103. One end of the vibration member 103 is fixed to one end of a piezoelectric element 102, the other end of which is fixed to the support member 101.

Consequently, the vibration member 103 vibrates in the axial direction with the vibration of the piezoelectric element 102. A movable member 104 also has two holes, through which the vibration member 103 is inserted. A leaf spring 105 is attached to the movable member 104 from below. A projection provided on the leaf spring 105 is pressed against the vibration member 103. The pressure exerted by the leaf spring 105 brings the movable member 104 and the vibration member 103 into frictional coupling with each other.

Figure 11B:
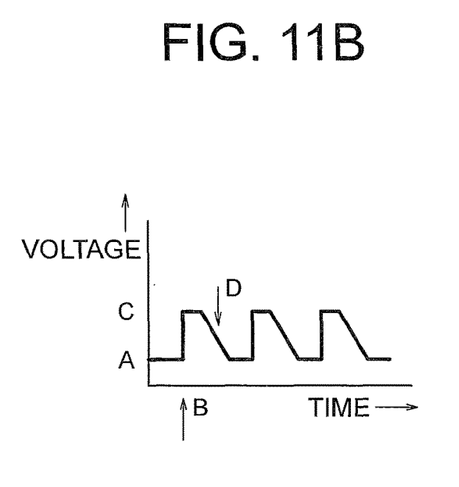
FIG. 11B shows a waveform of driving pulses for shifting the mover to the right.
Figure 11C:
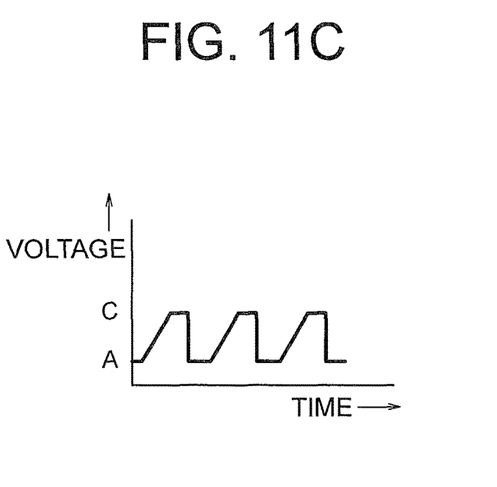
FIG. 11C shows a waveform of driving pulses for shifting the mover to the left.

FIGS. 11B and 11C show waveforms of driving pulses for driving the impact drive actuator. FIG. 11B shows a waveform of driving pulses for moving the movable member 104 to the right, and FIG. 11C shows a waveform of driving pulses for moving the movable member 104 to the left. The operation principle of the impact drive actuator will be described in the following with reference to these driving pulse waveforms. In the following description, it is assumed that the direction in which the piezoelectric element 102 expands is the left, and the direction in which the piezoelectric element contracts is the right.

When the movable member 104 is to be moved to the right, the driving pulse waveform shown in FIG. 11B is used. The driving pulse waveform has steep rise portions and gradual fall portions. The steep rise portions of the driving pulse waveform cause the piezoelectric element 102 to expand quickly. Because the vibration member 103 is fixed to the piezoelectric element 102, the vibration member 103 moves to the left at high speed with the quick expansion of the piezoelectric element 102. During that time, the inertia of the movable member 104 overcomes the frictional coupling force between it and the vibration member 103 (i.e.

frictional force between the vibration member 103 and the movable member 104 pressed against it by the leaf spring 105), and therefore the movable member 104 does not move to the left but stays at its position.

The gradual fall portions of the driving pulse waveform causes the piezoelectric element 102 to contract slowly. Then, the vibration member 103 slowly moves to the right with the slow contraction of the piezoelectric element 102. During that time, the inertia of the movable member 104 cannot overcome the frictional coupling force between it and the vibration member 103, and therefore the movable member 104 moves to the right with the movement of the vibration member 103.

On the other hand, when the movable member 104 is to be moved to the left, the driving pulse waveform shown in FIG. 11C is used. The driving pulse waveform has gradual rise portions and steep fall portions. The gradual rise portions of the driving pulse waveform cause the piezoelectric element 102 to expand slowly. Then, the vibration member 103 moves slowly to the left with the slow expansion of the piezoelectric element 102. During this time, the inertia of the movable member 104 cannot overcome the frictional coupling force between it and the vibration member 103, and therefore the movable member 104 moves to the left with the movement of the vibration member 103.

On the other hand, during the steep rise portions of the driving pulse waveform, the inertia of the movable member 104 overcomes the frictional coupling force between it and the vibration member 103, as with the case described above with reference to FIG. 11B, and therefore the movable member 104 does not move to the right but stays at its position.

Since the vibration member 103 is always pressed by the leaf spring 105, the movable member 104 is frictionally supported by the vibration member 103. In consequence, when the movable member 104 is stationary, its position is maintained.

As described above, the impact drive actuator utilizes the frictional coupling of the movable member 104 and the vibration member 103 provided by the leaf spring 105 and the inertia, and it can move the movable member 104 using driving pulse waveforms shown in FIGS. 11B and 11C.

SUMMARY OF THE INVENTION

An inertial drive actuator according to the present invention comprises:

a shift unit that generates a small shift in a first direction and in a second direction opposite to the first direction;

a vibration base plate that moves to and fro with the small shift of the shift unit;

a mover disposed on a flat surface of the vibration base plate and having a first magnetic field generating unit;

a first yoke that concentrates magnetic flux generated by the first magnetic field generating unit at predetermined positions in the N and S poles; and a second yoke disposed on a side of the vibration base plate facing away from the mover, wherein the first yoke and an end portion of the second yoke are opposed to each other at a position outside the vibration base plate, thereby mechanically restricting movement of the mover with respect to a direction perpendicular to the driving direction, and a frictional force acting between the mover and the vibration base plate is controlled by controlling a magnetic field generated by the first magnetic field generating unit to drive the mover.

BRIEF DESCRIPTION OF DRAWINGS

FIGS. 1A and 1B show the structure of an inertial drive actuator according to a first embodiment, where FIG. 1A is a side view, and FIG. 1B is a cross sectional view;

FIGS. 2A and 2B show the structure of an inertial drive actuator according to a second embodiment, where FIG. 2A is a side view, and FIG. 2B is a cross sectional view;

FIGS. 3A and 3B show the structure of an inertial drive actuator according to a third embodiment, where FIG. 3A is a side view, and FIG. 3B is a cross sectional view;

FIGS. 4A and 4B show the structure of an inertial drive actuator according to a fourth embodiment, where FIG. 4A is a side view, and FIG. 4B is a cross sectional view;

FIGS. 5A and 5B show the structure of an inertial drive actuator according to a fifth embodiment, where FIG. 5A is a side view, and FIG. 5B is a cross sectional view;

FIGS. 6A and 6B show the structure of an inertial drive actuator according to a sixth embodiment, where FIG. 6A is a side view, and FIG. 6B is a cross sectional view;

FIGS. 7A and 7B show the structure of an inertial drive actuator according to a seventh embodiment, where FIG. 7A is a side view, and FIG. 7B is a cross sectional view;

FIGS. 11A, 11B, and 11C show an impact drive actuator according to a prior art, where FIG. 11A shows the construction of the actuator.

DETAILED DESCRIPTION OF THE INVENTION

The construction, operations, and advantages of inertial drive actuators according to several embodiments will be described. It should be understood that the present invention is not limited by the embodiments. Although a lot of specific details will be described in the following description of the embodiments for the purpose of illustration, various modifications and changes can be made to the details without departing from the scope of the invention. The illustrative embodiments of the invention will be described in the following without any intension of invalidating the generality of or imposing any limitations on the claimed invention.

First Embodiment

Figure 1A:
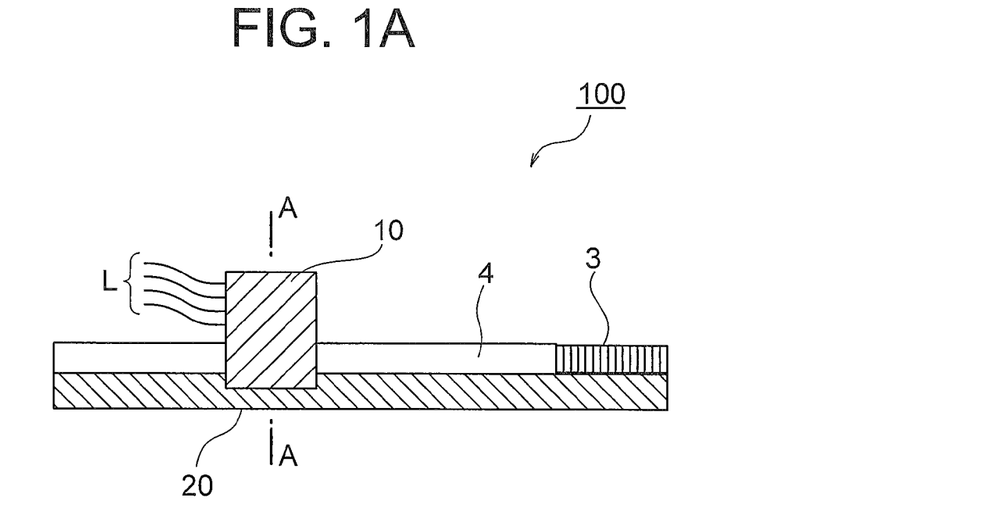
Figure 1B:
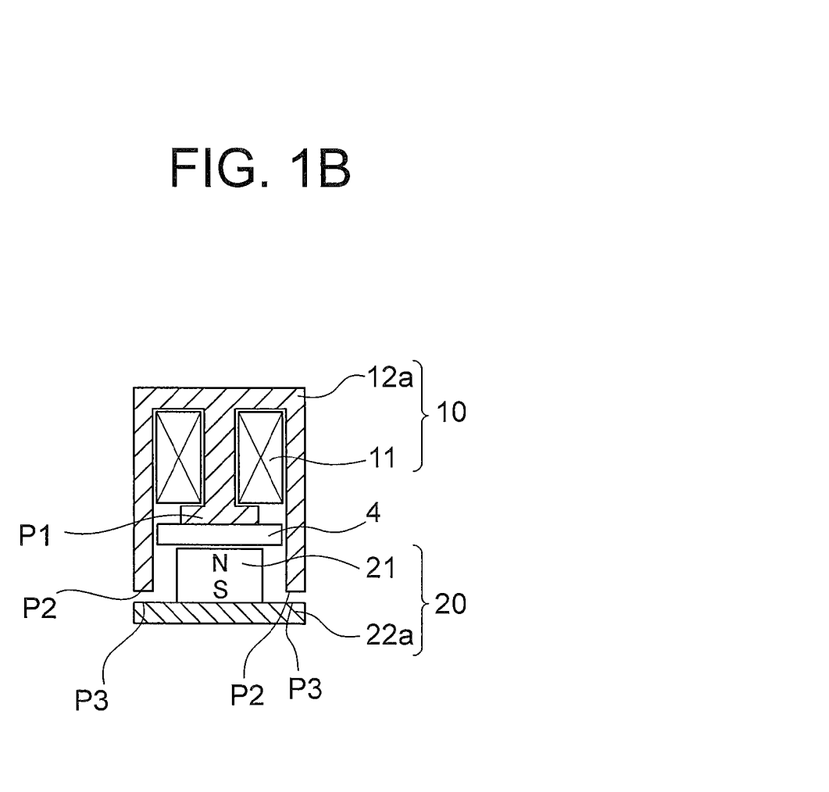

FIGS. 1A and 1B show an inertial drive actuator according to a first embodiment. FIG. 1A is a side view of the inertial drive actuator, and FIG. 1B is a cross sectional view taken along line A-A in FIG. 1A.

The inertial drive actuator 100 according to the first embodiment includes a piezoelectric element (shift unit) 3, a vibration base plate 4, a mover 10, and a stator 20. The piezoelectric element 3 and the vibration base plate 4 are disposed on top of the stator 20, and the mover 10 is disposed on top of the vibration base plate 4.

The mover 10 includes a coil 11 (first magnetic field generating unit) and a first yoke 12a (magnetic flux guide member). The first yoke 12a is a grooved member having a groove (or recess), which is partitioned by a T-shaped member at its center. The coil 11 is wound in a cylindrical shape around a coil core surrounding the T-shaped member. Wiring L for supplying electric current to the coil 11 extends out of the first yoke 12a. The grooved member and the T-shaped member are connected with each other.

The ends of the sides of the grooved member and the end of the T-shaped member of the first yoke 12a are at different levels. In other words, the sides of the grooved member extend beyond the vibration base plate 4 and their ends are positioned on the stator 20 side of the vibration base plate 4. On the other hand, the end of the T-shaped member is in contact with the top face of the vibration base plate 4.

The piezoelectric element 3 and the vibration base plate 4 are both plate-like components. The vibration base plate 4 is made of a non-magnetic material. One end of the piezoelectric element 3 and one end of the vibration base plate 4 are connected to each other by adhesive. They may be connected by mechanical means instead of adhesive. The other end of the piezoelectric element 3 (its end not adhered to the vibration base plate 4) is fixed to a first fixed member (not shown). The piezoelectric element 3 generates a small shift or displacement, which causes the vibration base plate 4 to move to and fro.

The stator 20 includes a permanent magnet 21 (second magnetic field generating unit) and a second yoke (magnetic flux guide member) 22a. The permanent magnet 21 is a cuboid component having an N-pole on one side and an S-pole on the other side. The second yoke 22a is a plate-like component. The permanent magnet 21 is disposed on the top face of the second yoke 22a with its N-pole side facing upward. Both ends of the stator 20 are fixed to a second fixed member (not shown).

The stator 20 may be fixed to the second fixed member by fixing the permanent magnet 21 and the second yoke 22a individually. Alternatively, the permanent magnet 21 and the second yoke 22a may be fixed (or connected) to each other beforehand, and at least one of them may be fixed to the second fixed member. One and the same member may serve as both the first and second fixed members, or the first fixed member and the second fixed member may be separate members.

As described above, in the inertial drive actuator 100 according to this embodiment, the ends of the first yoke 12a do not extend out beyond the vibration base plate 4 with respect to the longitudinal direction of the vibration base plate 4 (horizontal direction in FIG. 1A). Therefore, the movement of the mover 10 is not restricted with respect to the longitudinal direction of the vibration base plate 4. On the other hand, with respect to the direction perpendicular to the longitudinal direction of the vibration base plate 4 (horizontal direction in FIG. 1B), the end portions of the first yoke 12a are located outside the vibration base plate 4. The end portions of the first yoke 12a are located in the proximity of the vibration base plate 4. Therefore, the movement of the mover 10 is restricted with respect to the direction perpendicular to the longitudinal direction of the vibration base plate 4.

Now, the operation of the inertial drive actuator 100 will be described. The principle of driving (or method of driving) will be described with reference to FIG. 8. Current is supplied to the coil 11 in such a way that the S-pole is generated in the downward direction in the drawing. The yoke 12a is arranged on both sides of the coil 11. Therefore, the first yoke 12a can prevent magnetic flux generated by the coil 11 from leaking to the outside.

Figure 8:
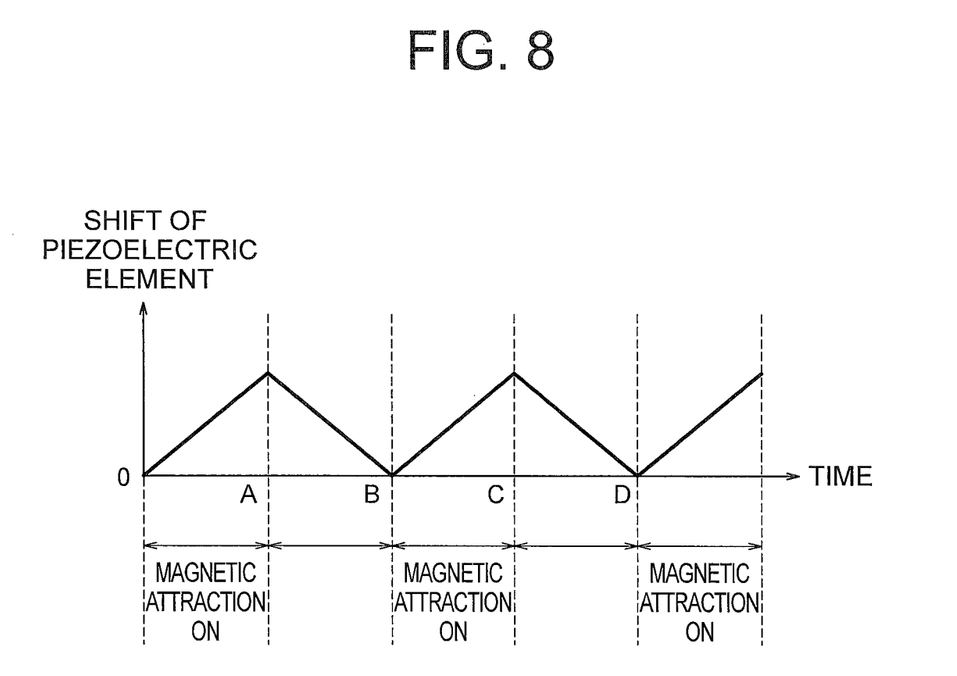
FIG. 8 illustrates a method of driving in operating the inertial drive actuator 100 according to the first embodiment.

In consequence, the S-pole concentrates to the center P1 of the lower part of the first yoke 12a, and the N-pole concentrates to both ends P2 of the lower part of the first yoke 12a. To reduce leakage of magnetic flux to the outside, it is preferred that the yoke 12a extend on one of the left and right sides to block magnetic flux. It is still more preferred that the yoke 12a extend on both the left and the right sides to block magnetic flux. The yoke 12 may be arranged to extend over a range that does not interfere with the vibration base plate 4.

On the other hand, in the stator 20 opposed to the first yoke 12a, the N-pole concentrates to the upper part of the permanent magnet 21, and the S pole concentrates to both ends P3 of the upper part of the second yoke 22a. Both ends P2 of the lower part of the first yoke 12a are located near both ends P3 of the upper part of the second yoke 22a. Thus, the permanent magnet 21 is surrounded by the first yoke 12a and the second yoke 22a. Consequently, magnetic flux generated by the permanent magnet 21 can be prevented from leaking to the outside by the first yoke 12a and the second yoke 22a.

As described above, in the inertial drive actuator according to this embodiment, leakage of magnetic flux to the outside is prevented in both the mover 10 and the stator 20, enabling the concentration of the S-pole and the N-pole to predetermined regions. Consequently, magnetic attractive force can be generated efficiently between the mover 10 and the stator 20 in the downward direction in the drawing.

Conversely, when current is supplied to the coil 11 in such a way that the S-pole is generated in the upward direction in the drawing, the N-pole concentrates to the center P1 of the lower part of the first yoke 12a, and the S-pole concentrates to both ends P2 of the lower part of the first yoke 12a. On the other hand, in the stator 20 opposed to the first yoke 12a, the N-pole concentrates to the upper part of the permanent magnet 21, and the S-pole concentrates to both ends P3 of the upper part of the second yoke 22a. Consequently, magnetic repulsive force can be generated efficiently in the upward direction in the drawing between the mover 10 and the stator 20.

The magnitude of the normal force acting between the mover 10 and the vibration base plate 4 (or the magnetic attractive or repulsive force acting between the mover 10 and the stator 20) can be varied by varying the amount of current supplied to the coil 11. This enables controlling the frictional force between the mover 10 and the vibration base plate 4.

As described above, the inertial drive actuator 100 according to this embodiment utilizes a magnetic force to move or drive the mover 10. Thus, the inertial drive actuator 100 according to this embodiment is free from an elastic member that might wear by driving. Therefore, moving or driving the mover 10 does not lead to wearing. Consequently, it is possible to move or drive the mover 10 (i.e. to move it to a desired position and to keep it at a desired position) stably for a long period of time. Moreover, the use of the yoke in the inertial drive actuator 100 according to this embodiment enables prevention of the leakage of magnetic flux to the outside. Consequently, the magnetic attractive force and the magnetic repulsive force can be generated efficiently. Therefore, the mover 10 can be moved or driven efficiently, while the inertial drive actuator is simple in structure and can be made at low cost.

In the inertial drive actuator 100 according to this embodiment, the both side portions of the first yoke 12a extend toward the second yoke 22a in such a way as to cover the edges of the vibration base plate 4. Therefore, the movement of the mover 10 is restricted by the both side portions of the first yoke 12a and the vibration base plate 4 with respect to the horizontal direction in FIG. 1B. Thus, the first yoke 12a in the inertial drive actuator 100 according to this embodiment has not only the function of preventing leakage of magnetic flux but also the guiding function of restricting the movement of the mover 10 with respect to a specific direction. (In other words, the first yoke 12a has multiple functions.) This can lead to reduction in the number of components and reduction in the size. It will be understood that while in the first embodiment, the movement of the mover 10 is restricted by the first yoke 12a and the vibration base plate 4, the movement of the mover 10 may be restricted by the fixed member not shown in the drawing and the first yoke 12a.

Furthermore, in this embodiment, the two yokes 12a and 22a can be brought closer to each other by a distance equal to the thickness of the vibration base plate. This enables more efficient confinement of magnetic flux.

Second Embodiment

Figure 2A:
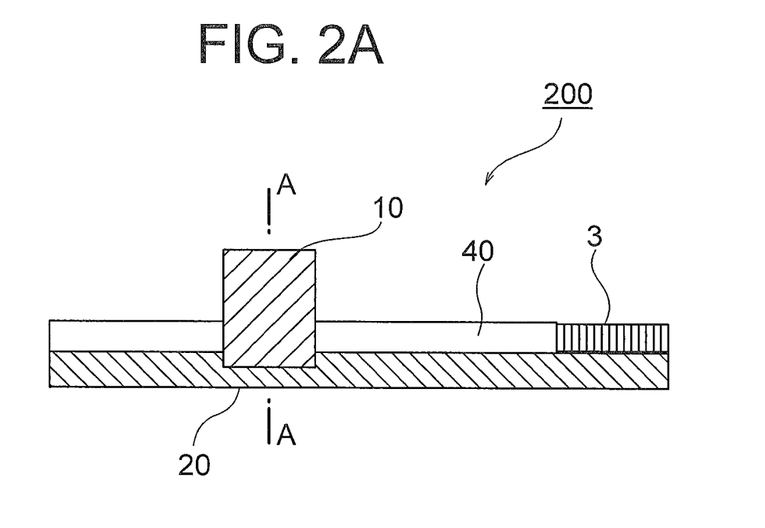
Figure 2B:
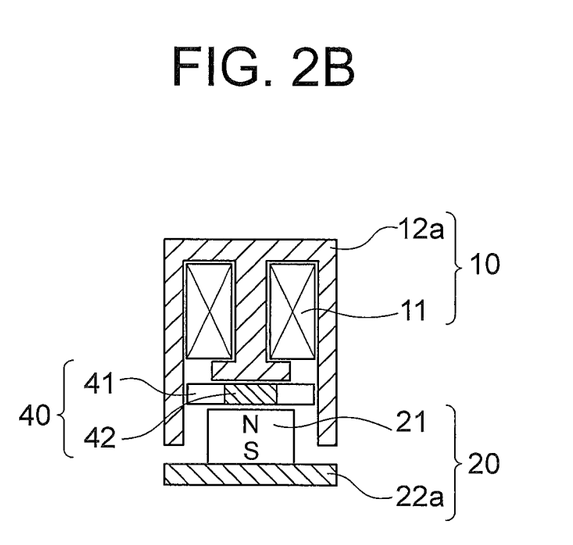

FIGS. 2A and 2B show an inertial drive actuator according to a second embodiment. FIG. 2A is a side view of the inertial drive actuator, and FIG. 2B is a cross sectional view taken along line A-A in FIG. 2A. The components same as those in the inertial drive actuator according to the first embodiment will be denoted by the same reference characters and will not be described further. Wiring is not illustrated in FIGS. 2A and 2B.

The inertial drive actuator 200 according to the second embodiment differs from the inertial drive actuator 100 according to the first embodiment in the construction of the vibration base plate. In the following, the vibration base plate will be described.

In the inertial drive actuator 200 according to the second embodiment, the vibration base plate 40 includes non-magnetic parts 41 and a magnetic part 42. The magnetic part 42 is a yoke part, and the non-magnetic parts 41 are arranged on both sides of the magnetic part 42. Alternatively, a non-magnetic part 41 may be provided in such a way as to surround a magnetic part 42 so that the magnetic part 42 is arranged as the inner part of the vibration base plate 40.

In the inertial drive actuator 200 according to the second embodiment, the above-described construction enables better prevention of leakage of magnetic flux flowing between the center of the lower part of the first yoke 12a and the permanent magnet 21. In consequence, magnetic attractive or repulsive force can be exerted on the mover 10 with improved efficiency.

Third Embodiment

Figure 3A:
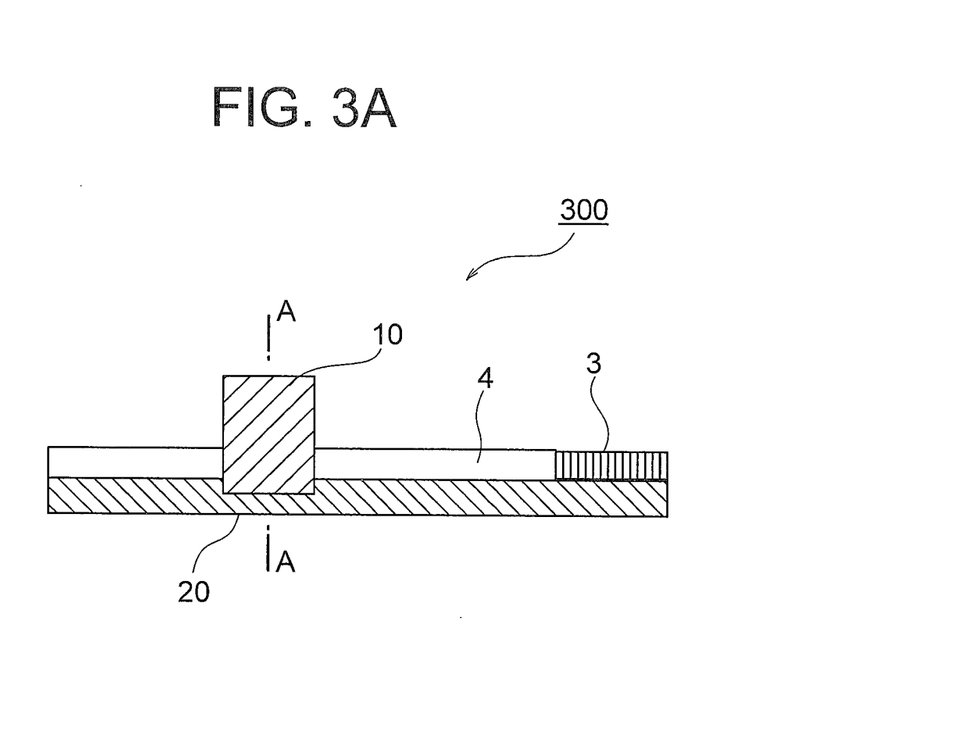
Figure 3B:
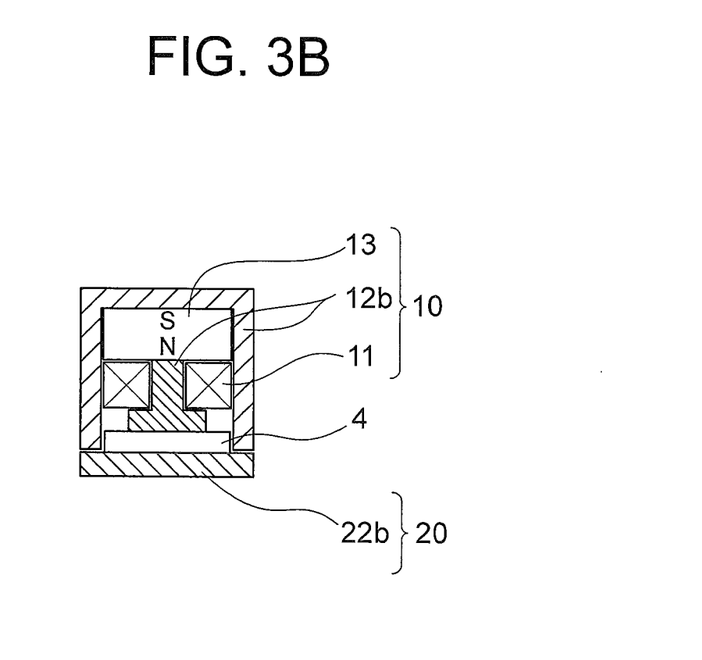

FIGS. 3A and 3B show an inertial drive actuator according to a third embodiment. FIG. 3A is a side view of the inertial drive actuator, and FIG. 3B is a cross sectional view taken along line A-A in FIG. 3A. The components same as those in the inertial drive actuator according to the first embodiment will be denoted by the same reference characters and will not be described further. Wiring is not illustrated in FIGS. 3A and 3B.

The inertial drive actuator 300 according to the third embodiment includes a piezoelectric element 3, a vibration base plate 4, a mover 10, and a stator 20. The piezoelectric element 3 and the vibration base plate 4 are disposed on top of the stator 20, and the mover 10 is disposed on top of the vibration base plate 4.

The mover 10 includes a coil 11, a first yoke 12b, and a permanent magnet 13. The first yoke 12b is a grooved member having a groove, which is partitioned by a T-shaped member at its center. The coil 11 is wound in a cylindrical shape around a coil core surrounding the T-shaped member. The grooved member and the T-shaped member are separated from each other, and the permanent magnet 13 is arranged between them. The permanent magnet 13 is disposed with its N-pole facing the T-shaped member. The stator 20 has a second yoke 22b. This embodiment differs from the first embodiment in that it lacks the permanent magnet 21 (second magnetic field generating unit) in the first embodiment.

In the inertial drive actuator 300 having the above-described construction, when current is supplied to the coil 11, for example, in such a way that the N-pole is generated in the downward direction in the drawing. Then, the N-pole concentrates to the center of the lower part of the first yoke 12b, and the S-pole concentrates to both ends of the lower part of the first yoke 12b.

As to the magnetic flux generated by the permanent magnet 13 also, the N-pole concentrates to the center of the lower part of the first yoke 12b, and the S-pole concentrates to both ends of the lower part of the first yoke 12b. In the stator 20 opposed to the first yoke 12b, magnetization in the reverse polarity is induced in the second yoke 22b. Specifically, an S-pole is induced at the center of the second yoke 22b, and N-poles are induced at both ends of the second yoke 22b. Consequently, a magnetic attractive force stronger than that in the case where no current is supplied to the coil 11 acts on the mover 10 in the downward direction in the drawing.

On the other hand, when current is supplied to the coil 11 in such a way that the N-pole concentrates to the upward direction in the drawing, a magnetic attractive force weaker than that in the case where no current is supplied to the coil 11 is generated. The magnitude of the normal force acting between the mover 10 and the vibration base plate 4 can be varied by varying the current supplied to the coil 11. This enables controlling the frictional force between the mover 10 and the vibration base plate 4.

As described above, in the inertial drive actuator 300 according to this embodiment, a magnetic force is used in moving or driving the mover 10. Thus, the inertial drive actuator 300 according to this embodiment is free from an elastic member that might wear by driving. Therefore, moving or driving the mover 10 does not lead to wearing. Consequently, it is possible to move or drive the mover 10 (i.e. to move it to a desired position and keep it at a desired position) stably for a long period of time. Moreover, the use of the yoke in the inertial drive actuator 300 according to this embodiment enables prevention of the leakage of magnetic flux to the outside. Consequently, the magnetic attractive force and the magnetic repulsive force can be generated efficiently. Therefore, the mover 10 can be moved or driven efficiently.

In the inertial drive actuator 300 according to this embodiment, the both side portions of the first yoke 12b extend toward the second yoke 22b in such a way as to cover the edges of the vibration base plate 4. Therefore, the movement of the mover 10 is restricted by the both side portions of the first yoke 12b and the vibration base plate 4 with respect to the horizontal direction in FIG. 3B. Thus, the first yoke 12b in the inertial drive actuator 300 according to this embodiment has not only the function of preventing leakage of magnetic flux but also the guiding function of restricting the movement of the mover 10 with respect to a specific direction. (In other words, the first yoke 12b has multiple functions.) Moreover, the size of the first yoke 12b with respect to the vertical direction of the drawing can be made smaller, enabling a reduction in the size of the mover 10 and the inertial drive actuator 300. Furthermore, because the stator 20 includes only the second yoke 22b, the construction of the stator 20 can be made simple.

Fourth Embodiment

Figure 4A:
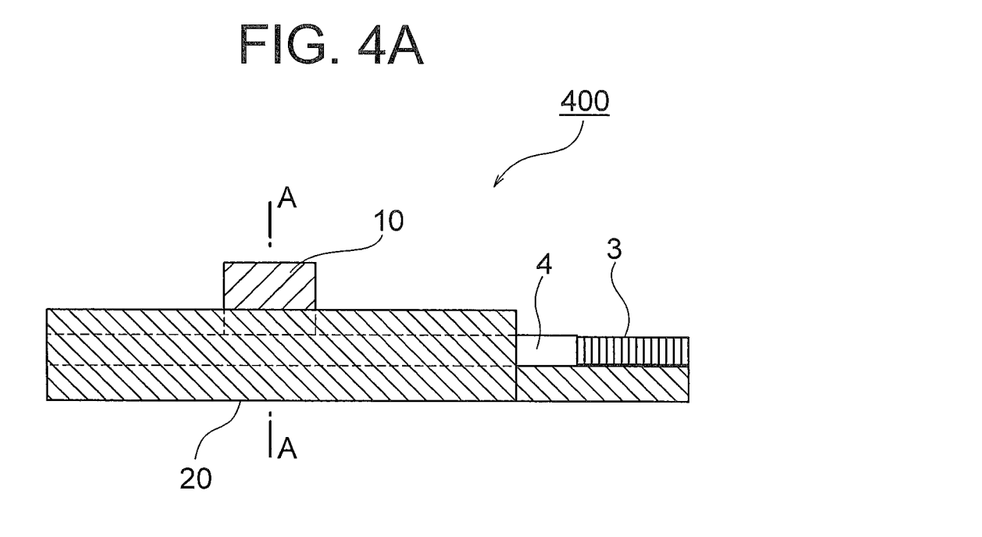
Figure 4B:
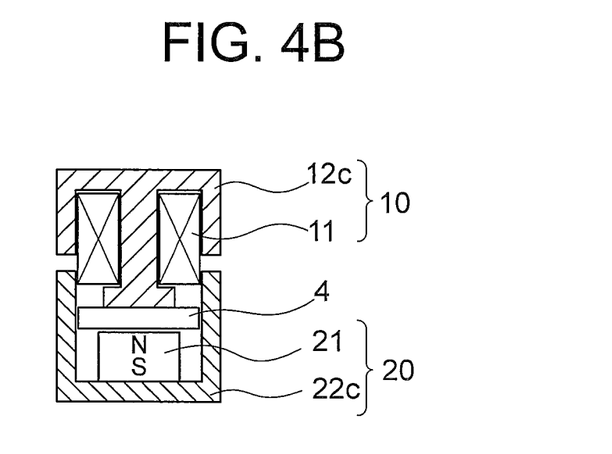

FIGS. 4A and 4B show an inertial drive actuator according to a fourth embodiment. FIG. 4A is a side view of the inertial drive actuator, and FIG. 4B is a cross sectional view taken along line A-A in FIG. 4A. The components same as those in the inertial drive actuator according to the first embodiment will be denoted by the same reference characters and will not be described further. Wiring is not illustrated in FIGS. 4A and 4B.

The inertial drive actuator 400 according to the fourth embodiment includes a piezoelectric element 3, a vibration base plate 4, a mover 10, and a stator 20. The piezoelectric element 3 and the vibration base plate 4 are disposed on top of the stator 20, and the mover 10 is disposed on top of the vibration base plate 4.

The inertial drive actuator 400 according to this embodiment differs from the inertial drive actuator 100 according to the first embodiment in the following respects. In this embodiment, the ends of the side walls of the grooved member of the first yoke 12c do not extend beyond the vibration base plate 4 and are not located on the stator 20 side of the vibration base plate 4. The second yoke 22c is a box-like member, and the ends of its side walls extends beyond the vibration base plate 4 to be located on the mover 10 side thereof.

Although there are the above differences, the coil 11 and the permanent magnet 21 are covered by the first yoke 12c and the second yoke 22c. In addition, the ends of the first yoke 12c and the ends of the second yoke 22c are arranged close to each other. In these respect, the inertial drive actuator 400 according to this embodiment is similar to the inertial drive actuator 100 according to the first embodiment.

Therefore, in the inertial drive actuator 400 according to this embodiment, as with the first embodiment, moving or driving the mover 10 does not lead to wearing. Consequently, it is possible to move or drive the mover 10 (i.e. to move it to a desired position and to keep it at a desired position) stably for a long period of time.

Moreover, the use of the yoke in the inertial drive actuator 400 according to this embodiment enables prevention of the leakage of magnetic flux to the outside. Consequently, the magnetic attractive force and the magnetic repulsive force can be generated efficiently. Therefore, the mover 10 can be moved or driven efficiently. Furthermore, in the inertial drive actuator 400 according to this embodiment, the mass of the mover 10 (the first yoke 12c) can be reduced, leading to further improvement in the stability of driving.

In the inertial drive actuator 400 according to this embodiment, the ends of the side walls of the second yoke 22c are located outside the coil 11. In addition, the side walls of the second yoke 22c are located in the proximity of the coil 11. Therefore, the movement of the mover 10 is restricted with respect to the direction perpendicular to the longitudinal direction of the vibration plate 4. It is preferred that the coil 11 be provided with a protection member or a protection film so that the coil 11 will not break even if the coil 11 comes in contact with the second yoke 22c. The coil 11 may have a smaller size, and the end of the T-shaped member (its portion that is in contact with the vibration plate 4) may have a size substantially the same as the vibration plate 4. By this design, the movement of the mover 10 can be restricted with respect to the direction perpendicular to the longitudinal direction of the vibration base plate 4.

Fifth Embodiment

Figure 5A:
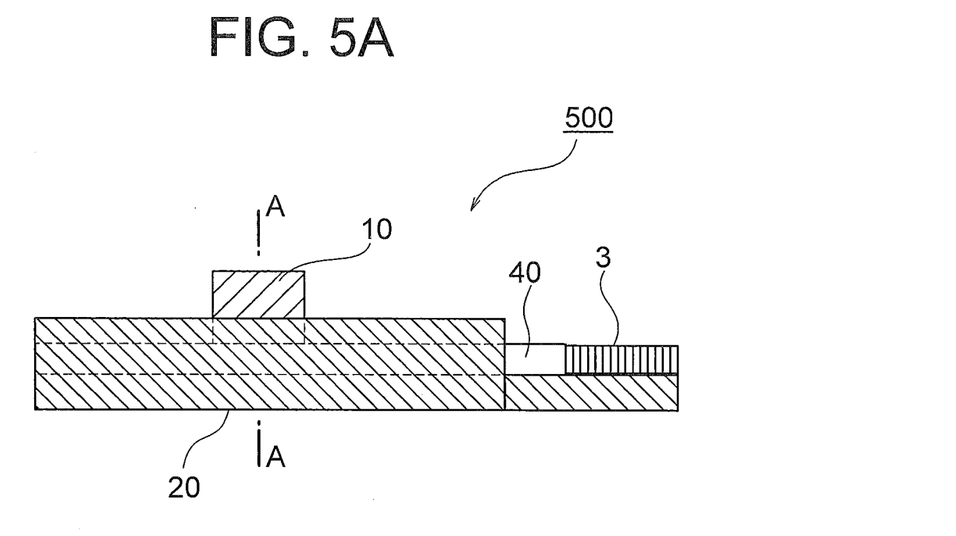
Figure 5B:
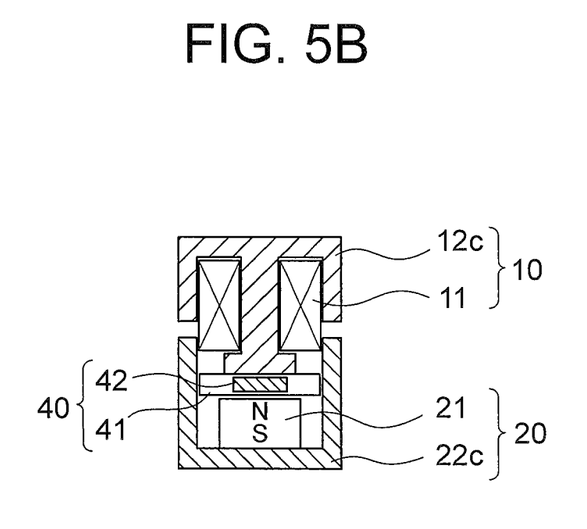

FIGS. 5A and 5B show an inertial drive actuator according to a fifth embodiment. FIG. 5A is a side view of the inertial drive actuator, and FIG. 5B is a cross sectional view taken along line A-A in FIG. 5A. The components same as those in the inertial drive actuator according to the fourth embodiment will be denoted by the same reference characters and will not be described further. Wiring is not illustrated in FIGS. 5A and 5B.

The construction of the inertial drive actuator 500 according to the fifth embodiment is the same the inertial drive actuator 400 according to the fourth embodiment except for the vibration base plate. The vibration base plate 40 in the inertial drive actuator 500 according to the fifth embodiment is similar to the vibration base plate 40 in the inertial drive actuator 200 according to the second embodiment.

The Vibration base plate 40 in the inertial drive actuator 500 according to the fifth embodiment includes a non-magnetic part 41 and a magnetic part 42. The non-magnetic part 41 is arranged in such a way as to surround the magnetic part 42 so that the magnetic part 42 is arranged as the inner part of the vibration base plate 40.

With the above-described construction, the inertial drive actuator 500 according to the fifth embodiment has the effects and advantages same as those described in the descriptions of the second embodiment and the fourth embodiment. Specifically, the restriction of the movement of the mover 10 with respect to the direction perpendicular to the driving direction and the prevention of leakage of magnetic flux can be achieved. Moreover, the size of the first yoke 12*c* with respect to the vertical direction of the drawing can be made small, enabling a reduction in the mass of the mover 10. This further improves the stability of driving.

Sixth Embodiment

Figure 6A:
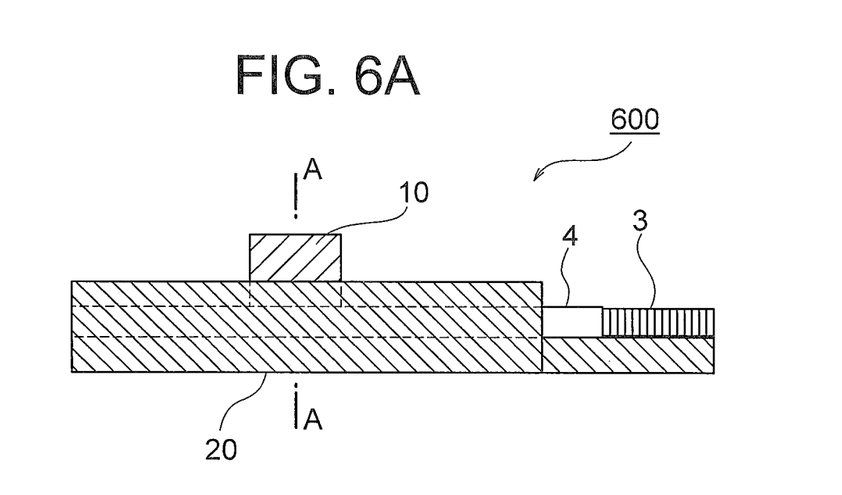
Figure 6B:
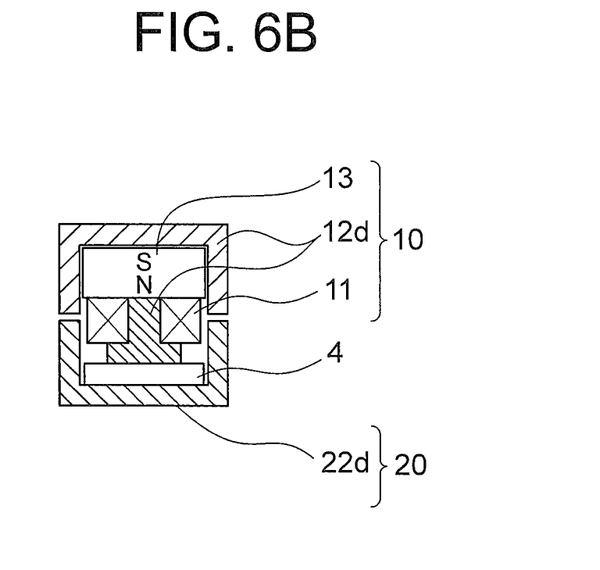

FIGS. 6A and 6B show an inertial drive actuator according to a fifth embodiment. FIG. 6A is a side view of the inertial drive actuator, and FIG. 6B is a cross sectional view taken along line A-A in FIG. 6A. The components same as those in the inertial drive actuator according to the third embodiment will be denoted by the same reference characters and will not be described further. Wiring is not illustrated in FIGS. 6A and 6B.

The inertial drive actuator 600 according to the sixth embodiment includes a piezoelectric element 3, a vibration base plate 4, a mover 10, and a stator 20. The piezoelectric element 3 and the vibration base plate 4 are disposed on top of the stator 20, and the mover 10 is disposed on top of the vibration base plate 4.

The inertial drive actuator 600 according to the sixth embodiment differs from the inertial drive actuator 300 according to the third embodiment in the following respects. In this embodiment, the end portions of the side walls of the grooved member of the first yoke 12*d* do not extend beyond the vibration base plate 4 and are not located on the stator 20 side of the vibration base plate 4. The second yoke 22*d* is a box-like member, and the ends of its side walls extends beyond the vibration base plate 4 to be located on the mover 10 side thereof.

Although there are the above differences, the coil 11 and the permanent magnet 13 are covered by the first yoke 12*d* and the second yoke 22*d*. In addition, the ends of the first yoke 12*d* and the ends of the second yoke 22*d* are arranged close to each other. In these respects, the inertial drive actuator 600 according to this embodiment is similar to the inertial drive actuator 300 according to the third embodiment.

Therefore, the inertial drive actuator 600 according to the sixth embodiment has the effects and advantages same as those described in the description of the third embodiment. Specifically, the restriction of the movement of the mover 10 with respect to the direction perpendicular to the driving direction and the prevention of leakage of magnetic flux can be achieved. Moreover, the size of the first yoke 12*d* with respect to the vertical direction of the drawing can be made small, enabling a reduction in the size of the mover 10 and in the size of the inertial drive actuator 600. Furthermore, because the stator 20 includes only the second yoke 22*d*, the construction of the stator 20 can be made simple.

Seventh Embodiment

Figure 7A:
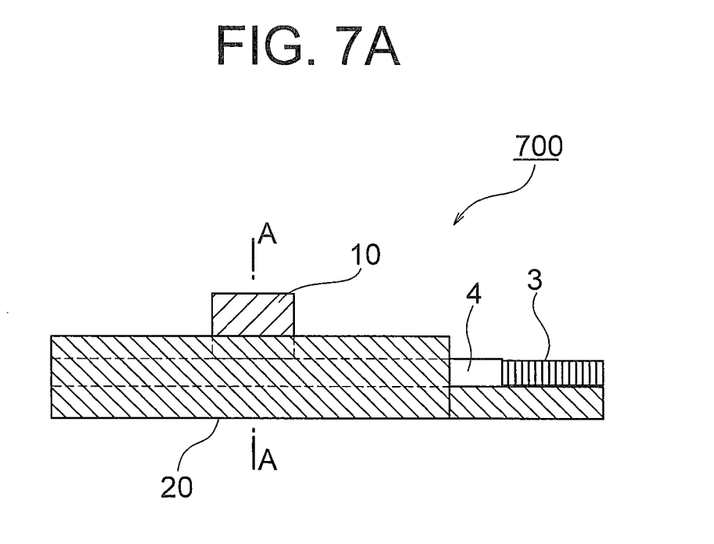
Figure 7B:
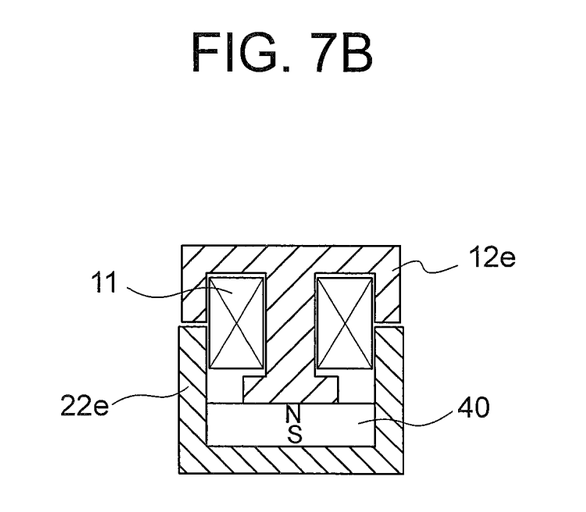

FIGS. 7A and 7B show an inertial drive actuator according to a seventh embodiment. FIG. 7A is aside view of the inertial drive actuator, and FIG. 7B is a cross sectional view taken along line A-A in FIG. 7A. The components same as those in the inertial drive actuator according to the above-described embodiments will be denoted by the same reference characters and will not be described further.

The inertial drive actuator 700 according to this embodiment differs from the embodiment described in the foregoing in that the vibration base plate 40 is made of a permanent magnet. The construction of the inertial drive actuator 700 according to this embodiment is similar to the other embodiment in the other respects.

Referring to the positions of the first yoke 12*e* and the second yoke 22*e*, the second yoke 22*e* runs outside the vibration base plate 40 to serve as a guide. However, the positions are not limited to the above, but the first yoke 12*e* may run outside the vibration base plate 40 to serve as a guide, as is the case with the other embodiments.

In this embodiment, the vibration base plate 40 also serves as a magnetic field generating unit. Therefore, reduction in the size of the inertial drive actuator can be achieved advantageously.

Next, the method of driving in the inertial drive actuator according to the embodiments will be described. FIG. 8 illustrates the method of driving in an inertial drive actuator, e.g. the inertial drive actuator 100 according to the first embodiment. In FIG. 8, the horizontal axis represents time, and the vertical axis represents shift of the piezoelectric element 3, where expanding shifts of the piezoelectric element 3 to the left in FIG. 1A are expressed by positive values.

During the time period from time 0 to time A, the piezoelectric element 3 is expanding. During this period, current is supplied to the coil 11 in such away that the S-pole is generated in the downward direction in the drawing. Then, the magnetic attractive force acts on the mover 10 in the direction toward the vibration base plate 4. In consequence, the frictional force between the mover 10 and the vibration base plate 4 increases. Consequently, as the vibration base plate 4 moves to the left in the drawing with the expansion of the piezoelectric member 3, the mover 10 moves to the left in the drawing accordingly.

During the time period from time A to time B, the piezoelectric element 3 is contracting. During this period, current supply to the coil 11 is suspended. Then, no magnetic attractive force acts on the mover 10. In consequence, the frictional force between the mover 10 and the vibration base plate 4 decreases. This means that the amount of slippage of the mover 10 relative to the movement of the vibration base plate 4 increases. Consequently, while the vibration base plate 4 moves to the right in the drawing with the contraction of the piezoelectric element, the mover 10 stays stationary at the shifted position. In this way, while the piezoelectric element 3 is contracting, the mover 10 slips to the left relative to the vibration base plate 4, which moves to the right in the drawing. Thus, the mover 10 shifts to the left in the drawing during the time period from time 0 to time B.

As the same operation is performed repeatedly in the time period from time B to time C, the time period from time C to time D and so on, the mover 10 moves or shifts to the left in the drawing. The mover 10 can also be moved to the right in the drawing by reversing the timing of current supply to the coil 11 shown in FIG. 8. Specifically, the mover 10 is moved to the right in the drawing, by supplying the coil 11 with current with which a magnetic repulsive force acting between the mover 10 and the vibration base plate 4 is generated instead of current with which a magnetic attractive force acting between the mover 10 and the vibration base plate 4 is generated, during the time period from time 0 to time A.

While in the above-described illustrative case, current supply is suspended during the time period from time A to time B, the coil 11 may be supplied with current with which a magnetic repulsive force acts between the mover 10 and the vibration base plate 4 during this period. This also enables the mover 10 to move in the same manner as described above.

Eighth Embodiment

Figure 9:
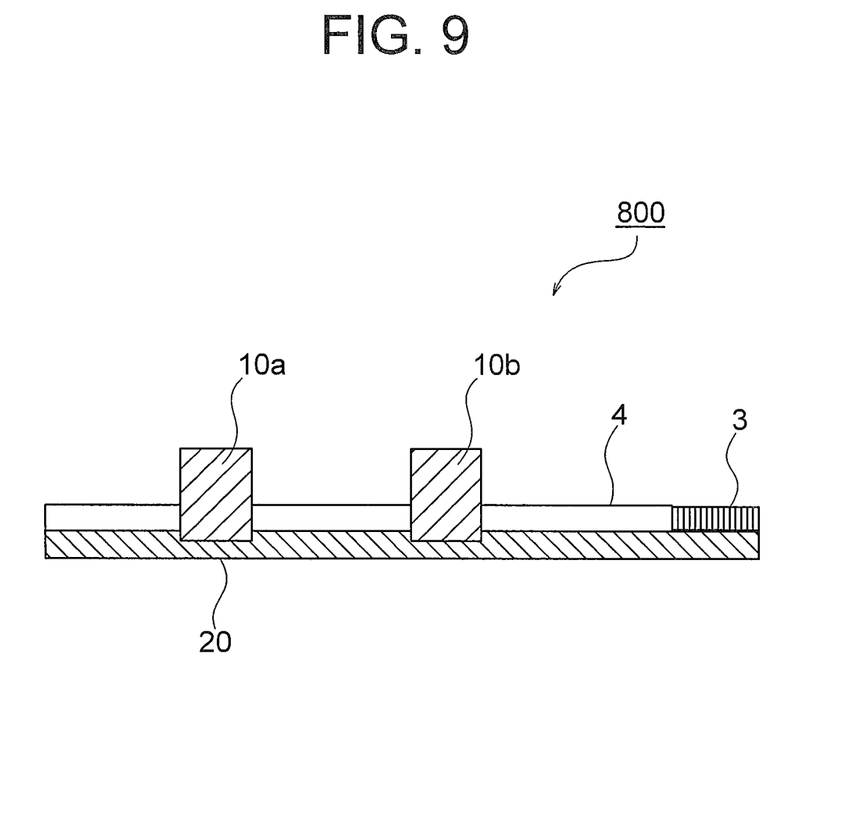
FIG. 9 is a side view showing the structure of an inertial drive actuator 800 according to a eighth embodiment.
Figure 10A:
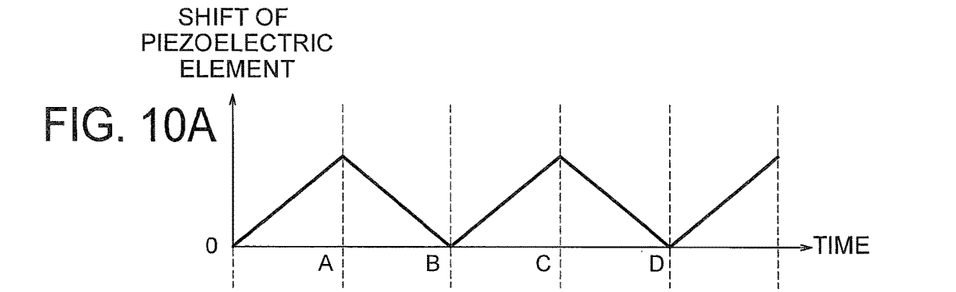
FIGS. 10A, 10B, and 10C illustrate a method of driving in operating the inertial drive actuator 800 according to the eighth embodiment.
Figure 10B:
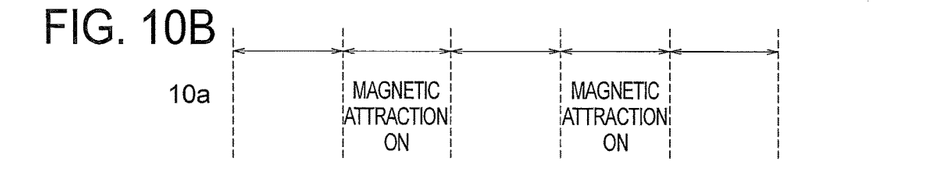
Figure 10C:
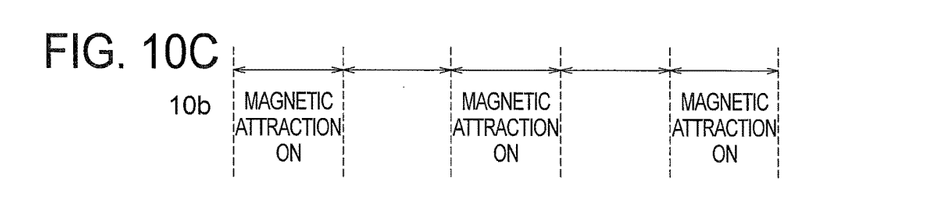

An inertial drive actuator according to an eighth embodiment is shown in FIG. 9. FIG. 9 is a side view of the inertial drive actuator similar to FIG. 1B. FIGS. 10A, 10B, and 10C illustrate a method of driving in the inertial drive actuator 800 according to the eighth embodiment.

The inertial drive actuator according to the eighth embodiment has two movers 10 like that in the inertial drive actuator 100 in the first embodiment. Specifically, the inertial drive actuator 800 according to the eighth embodiment includes a piezoelectric element 3, a vibration base plate 4, a mover 10a, a mover 10b, and a stator 20. The piezoelectric element 3 and the vibration base plate 4 are disposed on top of the stator 20, and the mover 10a and the mover 10b are disposed on top of the vibration base plate 4. Wiring for the mover 10a and mover 10b is not illustrated in FIG. 9.

The method of driving in the inertial drive actuator 800 will be described. In FIGS. 10A, 10B, and 10C, the horizontal axis represents time, and the vertical axis represents shift of the piezoelectric element 3, where expanding shifts of the piezoelectric element 3 to the left in FIG. 9 are expressed by positive values.

During the time period from time 0 to time A, the piezoelectric element 3 is expanding. During this period, current is not supplied to the coil 11 in the mover 10a. Then, no magnetic attractive force acts on the mover 10a. Consequently, the mover 10a stays stationary without changing its position. On the other hand, current is supplied to the coil 11 in the mover 10b in such a way that the S-pole is generated in the downward direction in the drawing. Then, a magnetic attractive force acts on the mover 10b in the direction toward the vibration base plate 4, as described above with reference to FIG. 8. In consequence, the mover 10b moves to the left in the drawing.

During the time period from time A to time B, the piezoelectric element 3 is contracting. During this period, current is supplied to the coil 11 in the mover 10a in such a way that the S-pole is generated in the downward direction in the drawing. Then, a magnetic attractive force acts on the mover 10a in the direction toward the vibration base plate 4, as described above with reference to FIG. 8. In consequence, the mover 10a moves to the right in the drawing. On the other hand, current is not supplied to the coil 11 in the mover 10b. Then, no magnetic attractive force acts on the mover 10b. Consequently, the mover 10b stays stationary without changing its position.

As described above, during the time period from time 0 to time A, the mover 10a stays stationary, and the mover 10b moves to the left in the drawing or toward the mover 10a. On the other hand, during the time period from time A to time B, the mover 10a moves to the right in the drawing or toward the mover 10b, and the mover 10b stays stationary. Consequently, the mover 10a and the mover 10b can be brought closer to each other. By performing the driving operation during the time period from time 0 to time B repeatedly, the mover 10a and the mover 10b can be brought further closer to each other. Moreover, by changing the driving method, it is also possible to move the mover 10a and the mover 10b in the same direction or to move the mover 10a and the mover 10b away from each other.

While a construction with two movers and a method of driving thereof have been described by way of illustration with reference to FIGS. 9, 10A, 10B, and 10C, more than two movers can be moved independently from each other on the same vibration base plate according to the same principle. Moreover, because the mover includes a coil in all of the first to seventh embodiments, the principle of driving illustrated in FIGS. 10A, 10B, 10C can be applied to all the embodiments. Therefore, it is possible to move a plurality of movers independently from each other on the same vibration base plate in the inertial drive actuators according to the embodiments.

Various modification can be made without departing from the essence of the present invention.

As described above, the present invention can suitably be applied to an inertial drive actuator capable of operating stably for a long period of time, for example in moving a mover to a desired position, stopping the mover at a desired position, and keeping the mover stationary.

The present invention can provide an inertial drive actuator that uses a magnetic force to reduce adverse effects of wearing etc. and can move or drive a mover efficiently by using a yoke.

What is claimed is:
1. An inertial drive actuator comprising:
a shift unit that generates a small shift in a first direction and in a second direction opposite to the first direction;
a vibration base plate that moves to and fro with the small shift of the shift unit;
a mover disposed on a flat surface of the vibration base plate and having a first magnetic field generating unit;
a first yoke that concentrates magnetic flux generated by the first magnetic field generating unit at predetermined positions in the N and S poles; and
a second yoke disposed on a side of the vibration base plate facing away from the mover, wherein the first yoke and an end portion of the second yoke are opposed to each other at a position outside the vibration base plate, thereby mechanically restricting movement of the mover with respect to a direction perpendicular to the driving direction, and a frictional force acting between the mover and the vibration base plate is controlled by controlling a magnetic field generated by the first magnetic field generating unit to drive the mover;

wherein:
the first yoke includes a cavity and the first yoke further having a member disposed within the cavity;
the member includes a first portion extending from the first yoke towards the vibration base plate; and
the member has a T-shape in cross-section.

2. An inertial drive actuator according to claim 1, further comprising a second magnetic field generating unit that generates a magnetic field relative to the magnetic field generated by the first magnetic field generating unit so that a magnetic attractive force or a magnetic repulsive force acts in the direction in which the mover is opposed to the vibration base plate.

3. The inertial drive actuator according to claim 1, wherein the first magnetic field generating unit comprises a magnet coil.

4. The inertial drive actuator according to claim 2, wherein the second magnetic field generating unit comprises a permanent magnet.

5. The inertial drive actuator according to claim 1, wherein the shift unit comprises a piezoelectric element.

6. The inertial drive actuator according to claim 1, wherein the vibration base plate is made of a non-magnetic material.

7. The inertial drive actuator according to claim 1, wherein the vibration base plate comprises a non-magnetic part and a magnetic part.

8. The inertial drive actuator according to claim 2, wherein at least a part of the vibration base plate comprises the second magnetic field generating unit.

9. The inertial drive actuator according to claim 1, wherein the vibration base plate also functions as the second yoke.

10. The inertial drive actuator according to claim 1, wherein the first magnetic field generating unit comprises a magnetic coil and a permanent magnet.

11. The inertial drive actuator according to claim 1, wherein the first magnetic field generating unit comprises a magnetic coil wound around the member.

12. An inertial drive actuator comprising:
a shift unit that generates a small shift in a first direction and in a second direction opposite to the first direction;
a vibration base plate that moves to and fro with the small shift of the shift unit;
a mover disposed on a first surface of the vibration base plate and having a first magnetic field generating unit;
a first yoke disposed on the first surface, the first yoke concentrates magnetic flux generated by the first magnetic field generating unit at predetermined positions in the N and S poles; and
a second yoke opposed to the first surface such that at least one end portion of each of the first and second yokes oppose each other, wherein
the at least one end portion of the first yoke and the at least one end portion of the second yoke are opposed to each other at a position outside the vibration base plate, thereby mechanically restricting movement of the mover with respect to a direction perpendicular to the driving direction, and
a frictional force acting between the mover and the vibration base plate is controlled by controlling a magnetic field generated by the first magnetic field generating unit to drive the mover;

wherein:
the first yoke includes a cavity and the first yoke further having a member disposed within the cavity;
the member includes a first portion extending from the first yoke towards the vibration base plate; and
the member has a T-shape in cross-section.

* * * * *